(12) United States Patent
Wang et al.

(10) Patent No.: US 8,319,886 B1
(45) Date of Patent: Nov. 27, 2012

(54) VOICE COIL MOTOR AND RELATED IMAGE CAPTURING MODULE

(75) Inventors: Yu-Bin Wang, New Taipei (TW); Chau-Yuan Ke, New Taipei (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/216,251

(22) Filed: Aug. 24, 2011

(30) Foreign Application Priority Data

Jun. 3, 2011 (TW) .................................. 100119618

(51) Int. Cl.
*H04N 5/225* (2006.01)
*H04N 3/06* (2006.01)
*G02B 7/02* (2006.01)
*G02B 15/14* (2006.01)

(52) U.S. Cl. ........ 348/374; 348/202; 359/694; 359/696; 359/814; 359/824

(58) Field of Classification Search .................. 348/202, 348/374; 359/694, 696, 814, 824
See application file for complete search history.

(56) References Cited

U.S. PATENT DOCUMENTS

| 7,876,515 | B2 * | 1/2011 | Liao | 359/824 |
| 2009/0009893 | A1 * | 1/2009 | Wang | 359/824 |
| 2011/0031822 | A1 * | 2/2011 | Chou | 310/12.16 |
| 2011/0039599 | A1 * | 2/2011 | Shiraki et al. | 455/556.1 |

* cited by examiner

*Primary Examiner* — Chieh M Fan
*Assistant Examiner* — Quang Le
(74) *Attorney, Agent, or Firm* — Altis Law Group, Inc.

(57) ABSTRACT

A voice coil motor includes a movable receiving cylinder having protrusions formed at an end; a wire coil surrounding the receiving cylinder; a hollow fixing frame receiving the receiving cylinder and the wire coil; magnetic members fixedly received in the fixing frame, top and bottom elastic members. The top elastic member includes a peripheral portion and a resilient central portion, the central portion having a central opening and cutouts. The protrusions of the receiving cylinder are engaged in the cutouts. The peripheral portion is fixed at a lower position than the central portion, thereby forming an elastic force applied to the receiving cylinder when no current is applied to the wire coil. The bottom elastic member is connected to the receiving cylinder and the fixing frame, and is in an undeformed state when no current is applied to the wire coil.

7 Claims, 6 Drawing Sheets

US 8,319,886 B1

VOICE COIL MOTOR AND RELATED IMAGE CAPTURING MODULE

BACKGROUND

1. Technical Field

The present disclosure relates to a voice coil motor and an image capturing module using same.

2. Description of Related Art

Voice coil motors (VCMs) are widely used as lens actuators in electronic devices having an image capturing function. A typical VCM includes a movable receiving cylinder for receiving a lens module, a group of magnetic members in cooperation with a wire coil for generating a driving force, a fixing frame and one or more elastic members connecting the movable receiving cylinder to the fixing frame.

Usually, no matter how many elastic members are used, the elastic members are all in an undeformed state, or all at a deformed state when the VCM is not initiated. However, if the one or more elastic members are all at an undeformed state, the movable receiving cylinder together with the lens module may be shaken if the entire module is taken downwards; and if the elastic members are all at a deformed state, the movable receiving cylinder may need to bear additional pressure, and the molding of the receiving cylinder will require a higher precision.

What is needed, therefore, is a voice coil motor and an image capturing module using same, which can overcome the above shortcomings.

BRIEF DESCRIPTION OF THE DRAWINGS

Many aspects of the present voice coil motor and image capturing module can be better understood with reference to the following drawings. The components in the drawings are not necessarily drawn to scale, the emphasis instead being placed upon clearly illustrating the principles of the present voice coil motor and image capturing module. Moreover, in the drawings, like reference numerals designate corresponding parts throughout the several views.

DETAILED DESCRIPTION

Embodiments of the present voice coil motor and image capturing module will now be described in detail below and with reference to the drawings.

Figure 1:
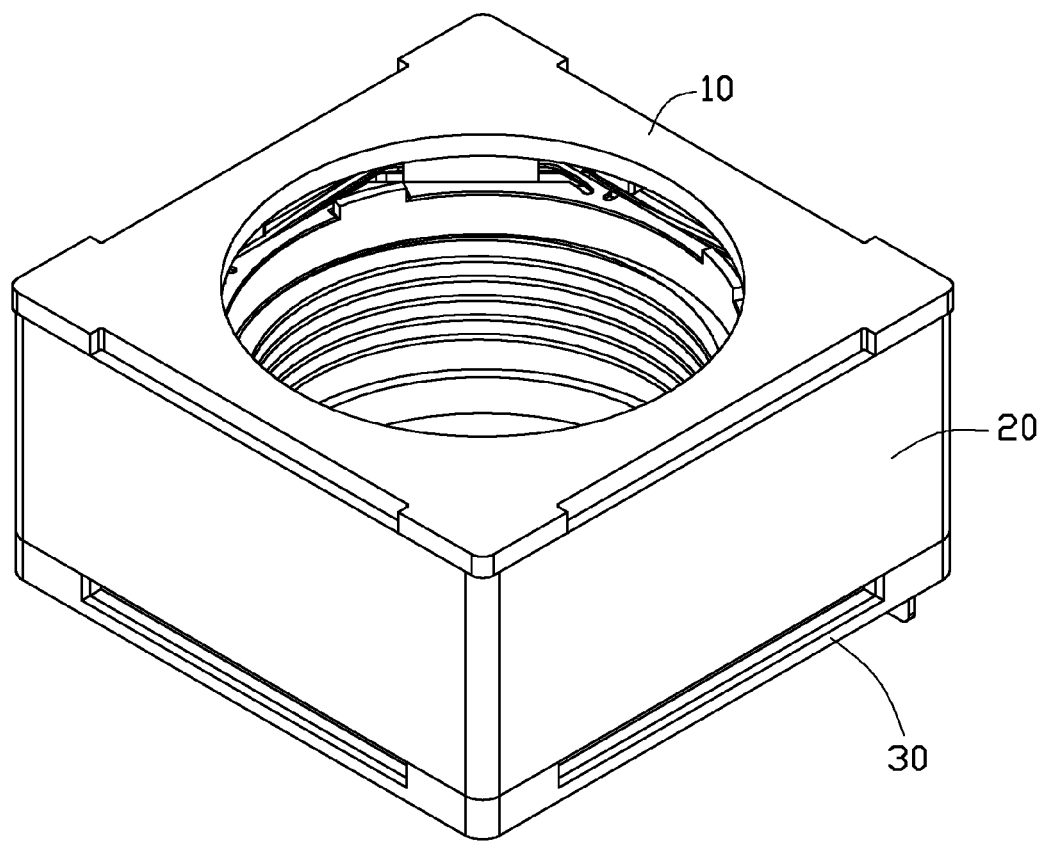
FIG. 1 is an isometric view of a voice coil motor in accordance with one embodiment.
Figure 2:
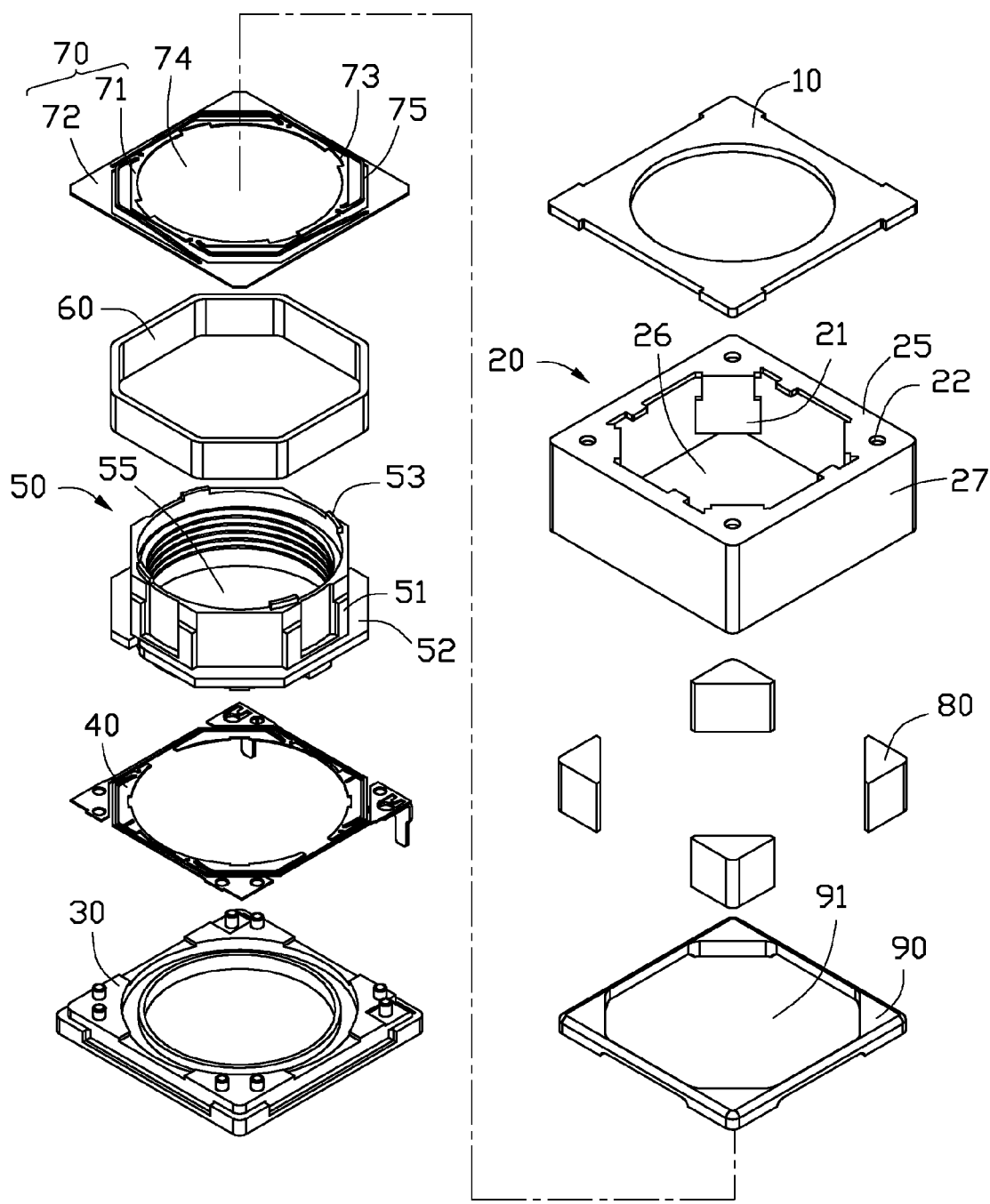
FIG. 2 is an exploded view of the voice coil motor of FIG. 1.
Figure 3:
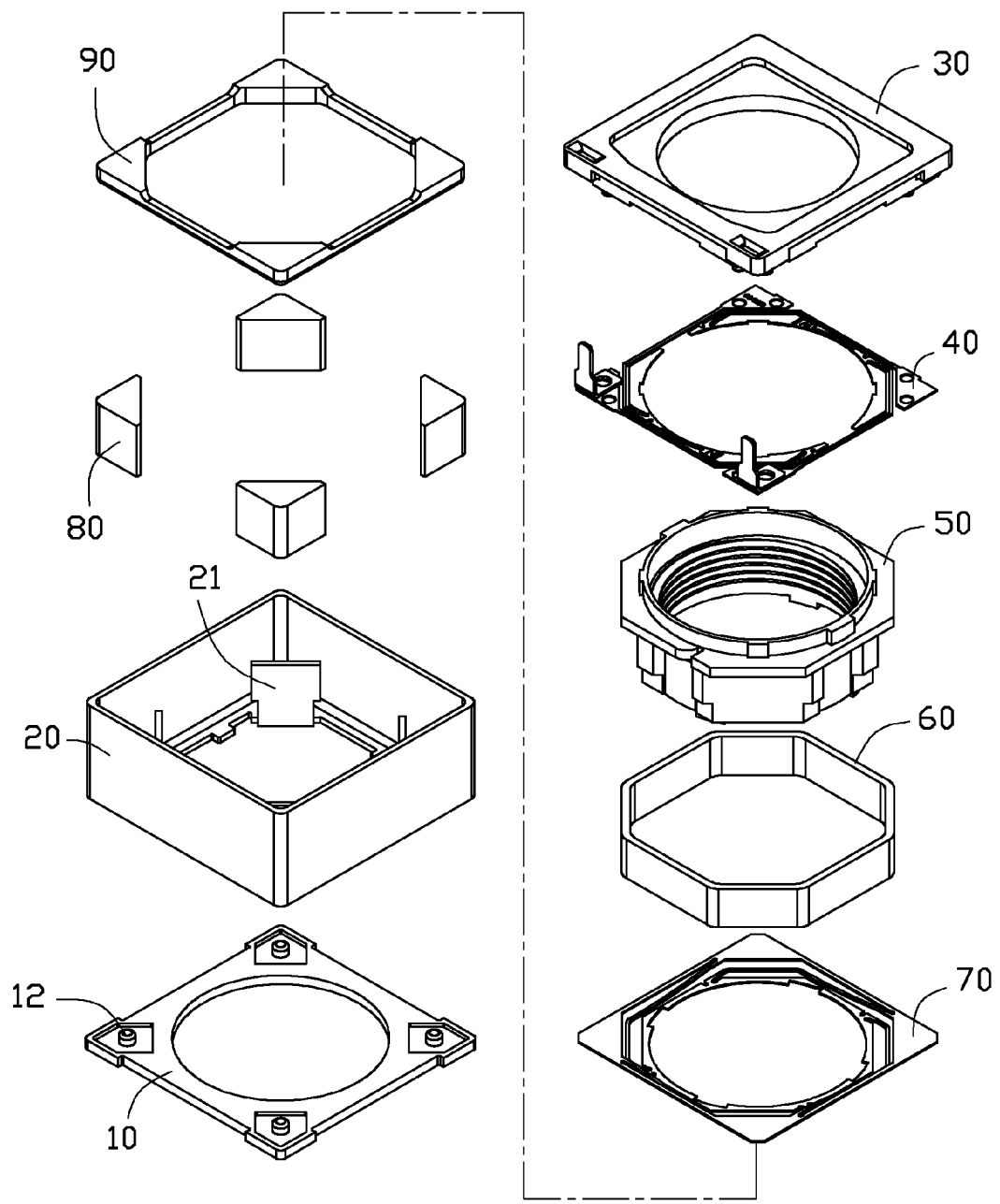
FIG. 3 is similar to FIG. 2, but shows the voice coil motor in an opposite view.

Referring to FIGS. 1 to 3, a voice coil motor (VCM) 100 includes a cover 10, a frame 20, a base 30, a bottom elastic member 40, a movable receiving cylinder 50, a wire coil 60, a top elastic member 70, a group of magnetic members 80 and a clamping member 90. The cover 10, frame 20, and base 30 together form a hollow outside fixing frame, and the bottom elastic member 40, the movable receiving cylinder 50, the wire coil 60, the top elastic member 70, the magnetic members 80, and the clamping member 90 are received in the fixing frame.

Figure 4:
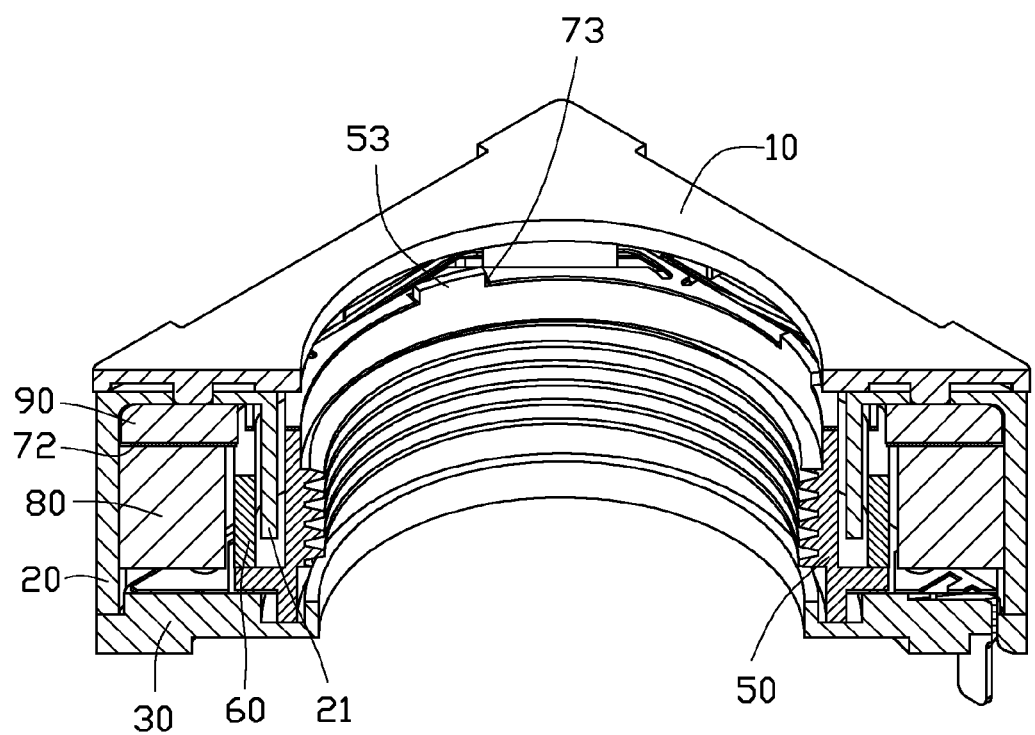
FIG. 4 is a cross-sectional view of the voice coil motor of FIG. 1 taken along a diagonal line.
Figure 5:
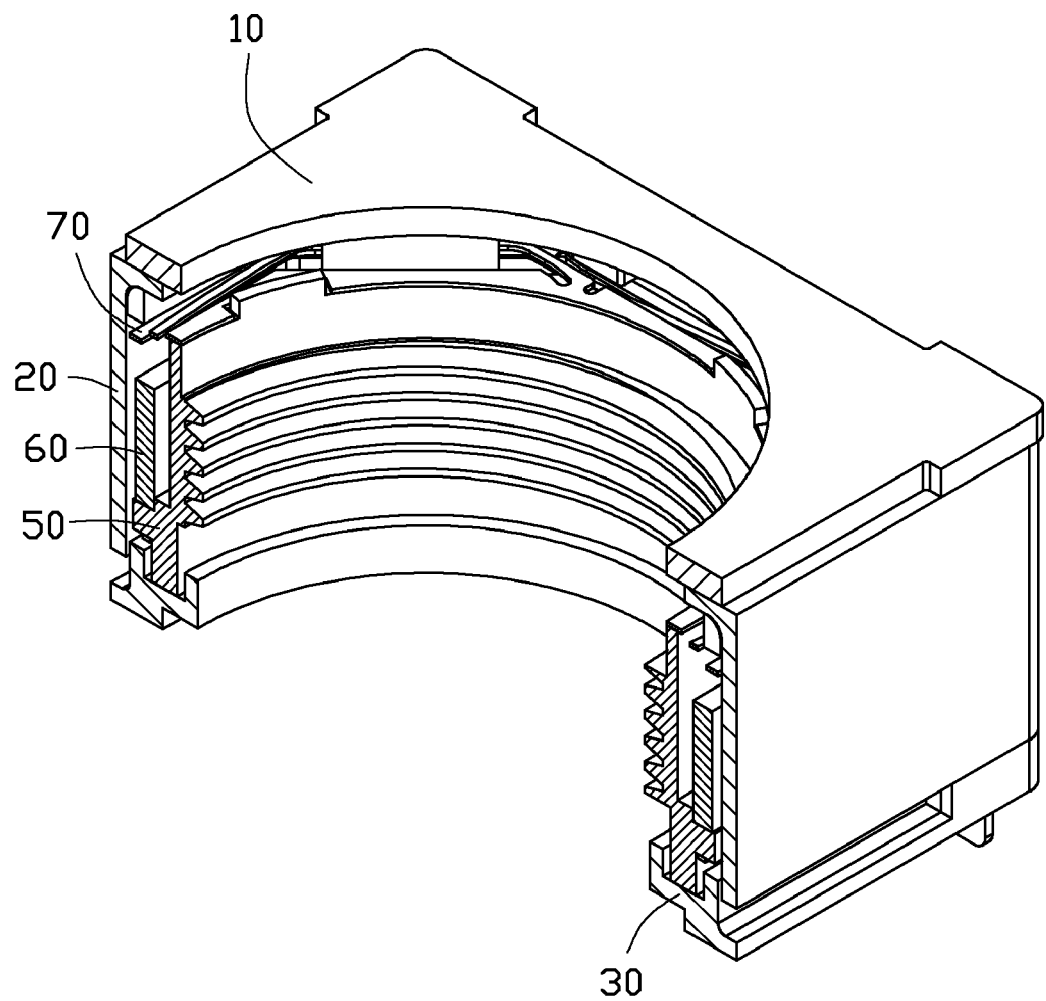
FIG. 5 is a cross-sectional view of the voice coil motor of the voice coil motor of FIG. 1 taken along a central parting line.

Referring also to FIGS. 4 and 5, the frame 20 is substantially rectangular, and includes a top panel 25 having an opening 26, and four side panels 27. Four tabs 21 extend from an inner wall of the opening 26 along a central axis direction of the frame 20, at positions corresponding to four corners of the frame 20. A length of each of the tabs 21 along the central axis direction is less than a height of the frame 20 and a height of the receiving cylinder 50. The tabs 21 define a plurality of first spaces between the inner wall of the frame 20 and the tabs 21. The top panel 25 further defines four through holes 22 at the positions corresponding to the four corners of the frame 20.

Figure 6:
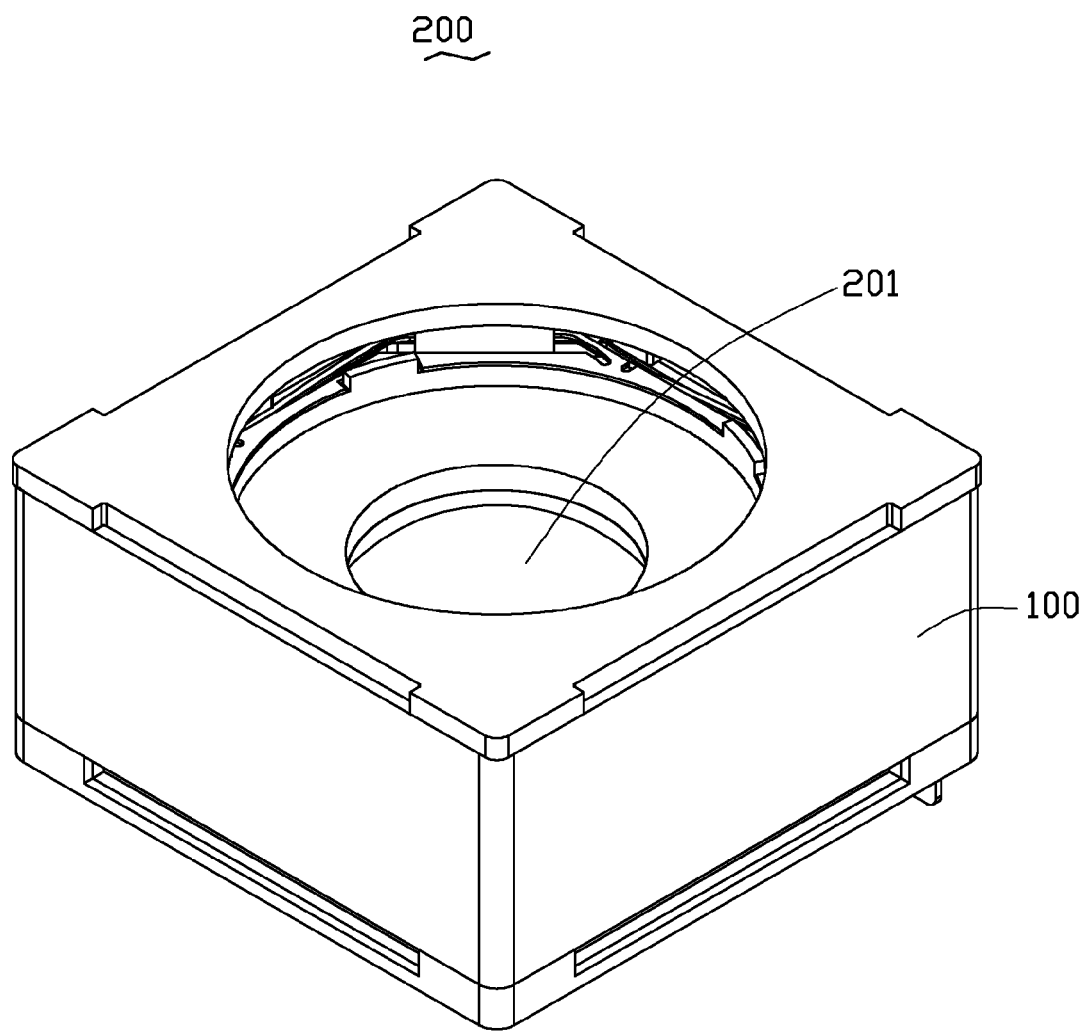
FIG. 6 is an isometric view of an image capturing module in accordance with one embodiment.

The receiving cylinder 50 has an inner receiving space 55 for receiving a lens module 201 (see FIG. 6). The receiving space 55 has an inner thread formed in the inner wall. The receiving cylinder 50 includes a first end and an opposite second end, with the first end located at an object side of the lens module and the second end located at an image side of the lens module. The receiving cylinder 50 has a plurality of protrusions 53 formed at an edge of the first end, and has a rim 52 formed at an outer wall adjacent to the second end. A plurality of ribs 51 are formed on the outer wall and extend upwards from the rim 52 along a direction parallel to a central axis of the receiving cylinder 50. The wire coil 60 is fixed on the rim 52, and each adjacent two of the ribs 51 defines a number of second spaces between the wire coil 60 and the outer wall of the receiving cylinder 50. Each of the tabs 21 extends into one of the second spaces when the receiving cylinder 50 is received in the frame 20. The tabs 21 are shorter than a height of the second space, thereby providing a movement space for the receiving cylinder 50 (see FIG. 4).

The magnetic members 80 are fixed on the inner wall of the frame 20 in the respective first space, and surround the wire coil 60. A height of each of the magnetic members 80 is less than a height of the receiving cylinder 50. A magnetic force between the magnetic members 80 and the wire coil 60 provides a driving force for driving the receiving cylinder 50 to move along the central axis direction of the frame 20 when a current is applied to the wire coil 60.

The top elastic member 70 is ring-shaped, and includes a resilient central portion 71 and a peripheral portion 72 surrounding the central portion 71. A plurality of slots 75 are formed between the central portion 71 and the peripheral portion 72 to provide elasticity for the central portion 71. The central portion 71 defines a central through hole 74, and a plurality of cutouts 73 formed in an inner wall of the central through hole 74. The top elastic member 70 is placed at the end of the receiving cylinder 50, with the protrusions 53 of the receiving cylinder 50 engaged in the cutouts 73 of the top elastic member 70.

The clamping member 90 is also a ring-shaped, and has a central through hole 91. The clamping member 90 is placed between the top panel 25 of the frame 20 and the top elastic member 70, and the central portion 71 of the top elastic member 70 extend through the central through hole 91 of the clamping member 90. The cover 10 has four protruding columns 12 corresponding to the through holes 22 of the top panel 25 of the frame 20, and the protruding columns 12 extend through the through holes 22 to abut against the clamping member 90, thus the clamping member 90 clamps the peripheral portion 72 of the top elastic member 70 on the magnetic members 80.

Due to the peripheral portion 72 of the top elastic member 70 clamping towards the magnetic members 80 (which is shorter than the receiving cylinder 50), and the central portion 71 of the top elastic member 70 engaging with the protrusions 53 of the receiving cylinder 50, an elastic pressing force is applied on the receiving cylinder 50 toward the image side. In this way, when no current is applied to the wire coil 60, i.e., when the VCM 100 is not initiated, the receiving cylinder 50 is pressed toward the image side, thus shaking of the receiving cylinder 50 together with the lens module 201 (see FIG. 6) can be avoided therein because the entire module is taken downwards. The pressing force can counteract the gravitational force of the receiving cylinder 50.

A part of the bottom elastic member 40 is fixed to the receiving cylinder 50, and another part of the bottom elastic member 40 is fixed to the base 30. When no current is applied to the wire coil 60, the receiving cylinder 50 sits on the base 30, and the bottom elastic member 40 is in an undeformed state.

With the above configuration, when the VCM 100 is not initiated, the receiving cylinder 50 only bears the pressure from the top elastic member 70. If a coefficient of rigidity of the top elastic member 70 is K, a deformation amount is $\Delta Y$, then the pressure can be expressed as $F=K\Delta Y$. The less the pressure the receiving cylinder 50 bears, the lower precision the mold and the molding of the receiving cylinder 50 will be. That is, the mold and the molding of the receiving cylinder 50 will have more tolerance of the precision thereof.

When a current is applied to the wire coil 60, i.e., when the VCM 100 is initiated, the bottom elastic member 40 can have deformation, and the top elastic member 70 can also have further deformation.

Referring to FIG. 6, the lens module 201 received in the receiving cylinder can include a lens barrel and a plurality of lenses received in the lens barrel. The lens barrel has an outer thread to threadedly engage in the receiving cylinder. The VCM 100 and the lens module 201 form an image capturing module 200 applicable in a camera, a mobile phone and other electronic devices.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A voice coil motor, comprising:
a movable receiving cylinder having an inner receiving space for receiving a lens module, the receiving cylinder comprising a first end and an opposite second end, the first end adjacent to an object side of the lens module and the second end adjacent to an image side of the lens module; the receiving cylinder comprising a plurality of protrusions formed at the first end;
a wire coil fixed to the receiving cylinder and surrounding the receiving cylinder;
a hollow fixing frame receiving the receiving cylinder and the wire coil;
a group of magnetic members fixed to an inner wall of the fixing frame and surrounding the wire coil, the magnetic members and the wire coil cooperatively configured for generating a magnetic driving force for driving the receiving cylinder to move in the fixing frame;
a top elastic member comprising a peripheral portion and a central portion resiliently connected to the peripheral portion, the central portion having a central opening and a plurality of cutouts formed in an inner edge thereof in the central opening, the protrusions of the receiving cylinder engaged in the cutouts, the peripheral portion being fixed at a position lower than the central portion, thereby forming an elastic force applied to the receiving cylinder in a direction from the first end to the second end when no current is applied to the wire coil; and
a bottom elastic member connected to the receiving cylinder and the fixing frame, the bottom elastic member being in an undeformed state when no current is applied to the wire coil.

2. The voice coil motor of claim 1, wherein the receiving cylinder further comprises a rim, a plurality of ribs are formed at an outer wall of the rim of the receiving cylinder, the rim extending outwards from the outer wall along a circumferential direction of the receiving cylinder, the ribs extending upwards from the rim along a central axis direction of the receiving cylinder, the wire coil fixed on the rim, the ribs configured for creating a first space between the wire coil and the outer wall of the receiving cylinder.

3. The voice coil motor of claim 2, wherein the fixing frame comprises a base, a frame and a cover, the frame has a top panel having an opening, and a plurality of tabs depending from an inner wall of the top panel in the opening along a central axis direction of the frame, a second space is formed between the inner wall of the frame and each of the tabs, each of the tabs extending into the first space, and the magnetic members being received in the respective second space.

4. The voice coil motor of claim 1, further comprising a ring-shaped clamping member for clamping the peripheral portion of top elastic member, a height of each of the magnetic members is less than a height of the receiving cylinder, the clamping member clamping the peripheral portion of the top elastic member on the magnetic members.

5. The voice coil motor of claim 1, wherein the top elastic member has a plurality of slots formed between the peripheral portion and the central portion.

6. The voice coil motor of claim 1, wherein the receiving cylinder has an inner thread formed in the inner wall of the inner space threadedly engaging with the lens module.

7. An image capturing module, comprising:
a voice coil motor of claim 1; and
a lens module received in the inner space of the receiving cylinder of the voice coil motor.

* * * * *